United States Patent
Chen et al.

(10) Patent No.: US 6,707,270 B2
(45) Date of Patent: Mar. 16, 2004

(54) SYSTEM AND METHOD FOR INDUCTION MOTOR CONTROL

(75) Inventors: Li Chen, Livonia, MI (US); Kerry Eden Grand, Chesterfield, MI (US); Richard Joseph Hampo, Plymouth, MI (US); Vinod Reddy, Ocala, FL (US); Xingyi Xu, Canton, MI (US); Nick Langovsky, Inkster, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 10/010,307

(22) Filed: Nov. 13, 2001

(65) Prior Publication Data

US 2003/0090226 A1 May 15, 2003

(51) Int. Cl.[7] .............................. H02P 7/36; H02P 7/62
(52) U.S. Cl. ..................... 318/798; 318/806; 318/808
(58) Field of Search .................. 318/438, 798, 318/801, 701, 727, 805, 806, 808, 810, 812

(56) References Cited

U.S. PATENT DOCUMENTS

| | | | | |
|---|---|---|---|---|
| 4,724,373 A | * | 2/1988 | Lipo | 318/805 |
| 5,086,264 A | * | 2/1992 | Kelledes et al. | 318/798 |
| 5,446,363 A | | 8/1995 | Kurosawa et al. | 318/806 |
| 5,479,081 A | | 12/1995 | Seibel et al. | 318/805 |
| 5,739,664 A | * | 4/1998 | Deng et al. | 318/808 |
| 6,097,171 A | * | 8/2000 | Branecky | 318/808 |
| 6,184,648 B1 | | 2/2001 | Kato et al. | 318/811 |
| 6,377,019 B1 | * | 4/2002 | Chen | 318/807 |
| 6,465,977 B1 | * | 10/2002 | Farkas et al. | 318/432 |

* cited by examiner

Primary Examiner—Robert Nappi
Assistant Examiner—Eduardo Colon-Santana
(74) Attorney, Agent, or Firm—Seed IP Law Group PLLC

(57) ABSTRACT

System and method for enhancing the torque output of a field oriented induction motor including a controller having a plurality of predetermined control parameters operable for processing input signals to generate output signals. The plurality of predetermined control parameters are dependent upon the nature of the input signals and the operational state of the motor. A sensor system is operable for communicating feedback signals related to the output signals and the operational state of the motor from the motor to the controller.

24 Claims, 5 Drawing Sheets

SYSTEM AND METHOD FOR INDUCTION MOTOR CONTROL

BACKGROUND OF INVENTION

The present invention relates generally to systems and methods for directing and controlling the operation of an induction motor and, more specifically, to systems and methods for enhancing the torque output of a field oriented induction motor operating in an overmodulation/field-weakening state.

he "fuel" powering a field oriented induction motor is current. This current may be divided into two components, torque current and flux current. Torque current may be viewed as that component of the current which generates motive force, or torque. Flux current may be viewed as that component of the current which generates magnetic flux in the rotor. Shaft torque and rotor flux are related, with shaft torque being proportional to the product of rotor flux times torque current.

Typically, the torque current and slip frequency of a field oriented induction motor, operating in a normal modulation state, are calculated using simple control parameters or equations which include two parts. The first part of these equations, commonly referred to as the feed forward or open loop portion, takes into account variables such as the reference or commanded torque, the flux feedback, the torque current, and the flux current. The second part of these equations, commonly referred to as the feedback or closed loop portion, takes into account variables such as the torque feedback and direct-axis back-EMF voltage feedback, as communicated to a proportional and integral controller (PI controller).

[t high speed, it is desirable for a field oriented induction motor to operate in an overmodulation/field-weakening state, maximizing the available torque. However, in such a state, feedback oscillates, current waveforms become non-sinusoidal, and the system becomes generally unstable. Thus, in an overmodulation/field-weakening state the equations discussed above break down, resulting in inaccurate torque current and slip frequency calculations, and diminished torque output.

SUMMARY OF INVENTION

The present invention overcomes the above problems and provides systems and methods for enhancing the torque output of a field oriented induction motor operating in an overmodulation/field-weakening state. Specifically, the present invention provides systems and methods for enhancing the conversion from a reference torque command to a processed torque current or slip frequency command.

In one embodiment, a system for enhancing the torque output of a field oriented induction motor includes a controller having a plurality of predetermined control parameters operable for processing input signals to generate output signals, the plurality of predetermined control parameters dependent upon the nature of the input signals and the operational state of the motor, and a sensor system operable for communicating feedback signals related to the output signals and the operational state of the motor from the motor to the controller.

In another embodiment, a method for enhancing the torque output of a field oriented induction motor includes, using a plurality of predetermined control parameters, processing input signals to generate output signals, the plurality of predetermined control parameters dependent upon the nature of the input signals and the operational state of the motor, and communicating feedback signals related to the output signals and the operational state of the motor from the motor to a controller.

DETAILED DESCRIPTION

Figure 1:
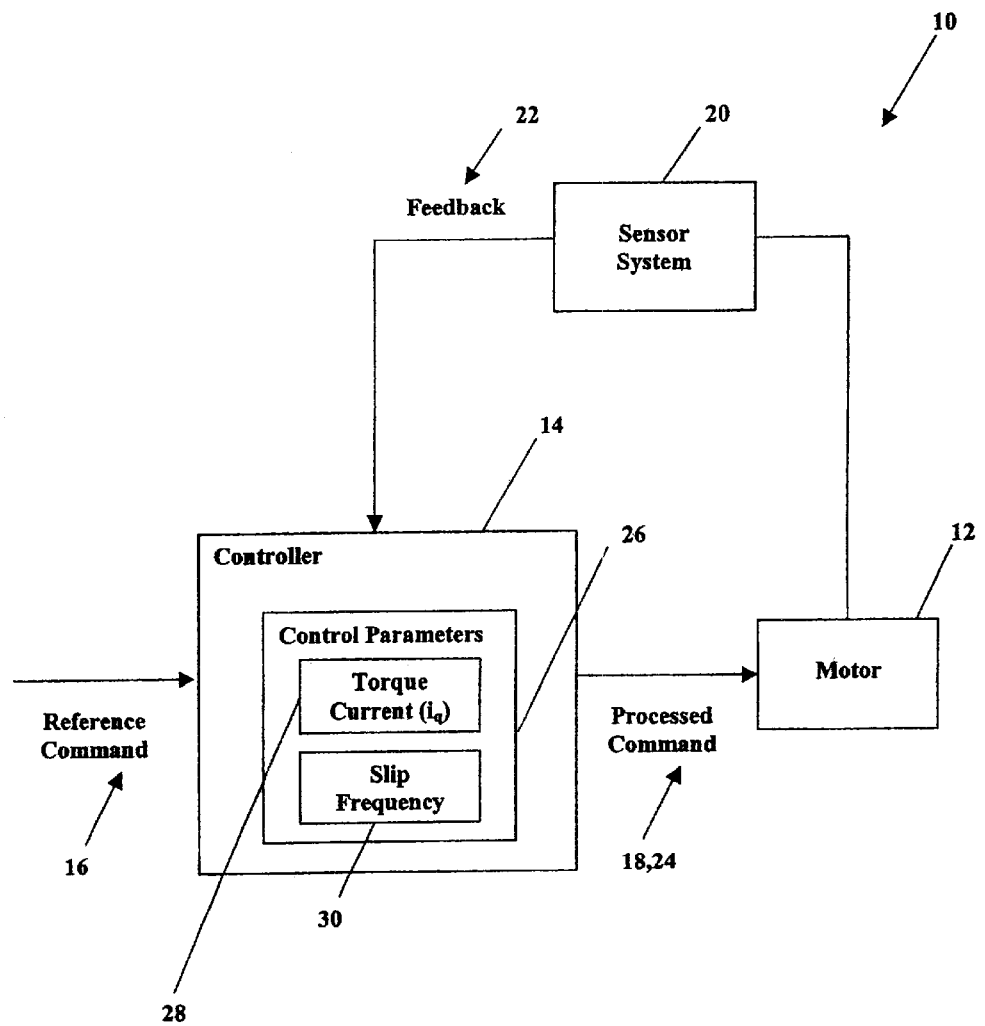
FIG. 1 is a schematic/functional block diagram of one embodiment of a system for enhancing the torque output of a field oriented induction motor operating in an overmodulation/field-weakening state, the system including a controller utilizing a plurality of control parameters.

Referring to FIG. 1, one embodiment of a system 10 for directing and controlling the operation of a field oriented induction motor 12 includes a controller 14 operable for converting a reference command 16 into a processed command 18 for directing and controlling the operation of the motor 12. The reference command 16 may be, for example, a torque command (TorqueRef). The processed command 18 may be, for example, a torque current command ($i_q$) or a slip frequency command (slipFrequency). The system 10 also preferably includes a sensor system 20 for measuring the actual or estimated operation of the motor 12. The sensor system 20 may measure, for example, torque (TorqueFb), flux (fluxFb), or direct-axis back-EMF voltage (emf_d_Fb). The sensor system 20 converts these measurements into feedback signals 22 which are communicated to the controller 14. The controller 14 then compares the feedback signals 22 to the reference command 16, generates an error signal, and adjusts the processed command 18 accordingly, generating a modified processed command 24. The modified processed command 24 may then be used for directing and controlling the operation of the motor 12. In this manner, the operation of the motor 12 is directed and controlled such that it operates in accordance with the reference command 16.

The controller 14, which may include a computer, a programmable logic unit, or any other suitable device capable of receiving operational inputs and processing them to generate operational outputs, may include a plurality of predetermined control parameters 26 related to torque current 28, slip frequency 30, etc. With respect to torque current 28, in one embodiment of the present invention, a first predetermined control parameter 26 may be defined by the following equation:

$$i_q = TorqueRef/(3 fluxFb) + PI\_Controller(TorqueRef - TorqueFb), \quad (1)$$

where TorqueRef is a commanded torque value or reference command, fluxFb is the flux feedback, and TorqueFb is the torque feedback. The PI controller is a proportional and integral controller, as discussed above.

The above equation (1) applies only while the motor 12 is operating in a normal modulation state. At high speeds, once a state of overmodulation is reached, the torque feedback (TorqueFb) is no longer smooth and the motor phase current is no longer a pure sinusoidal waveform. Thus, in this overmodulation state, it is desirable that the conversion from a reference or commanded torque (TorqueRef) to a torque current $i_q$ depends primarily upon the forward value (TorqueRef/(3fluxFb)) of the torque current $i_q$ due to the fact that the output of the PI controller is oscillated with the feedback torque TorqueFb while the torque current $i_q$ must remain stable for enhanced control. To overcome this problem, a second predetermined control parameter 26 may be used to generate a processed command 18, 24. For the second predetermined control parameter 26, the gain of the PI controller may be reduced to about $\frac{1}{4}^{th}$ to about $\frac{1}{20}^{th}$, and more preferably to about $\frac{1}{10}^{th}$, of the value typically used during overmodulation operation; that is, during normal modulation operation.

Figure 2:
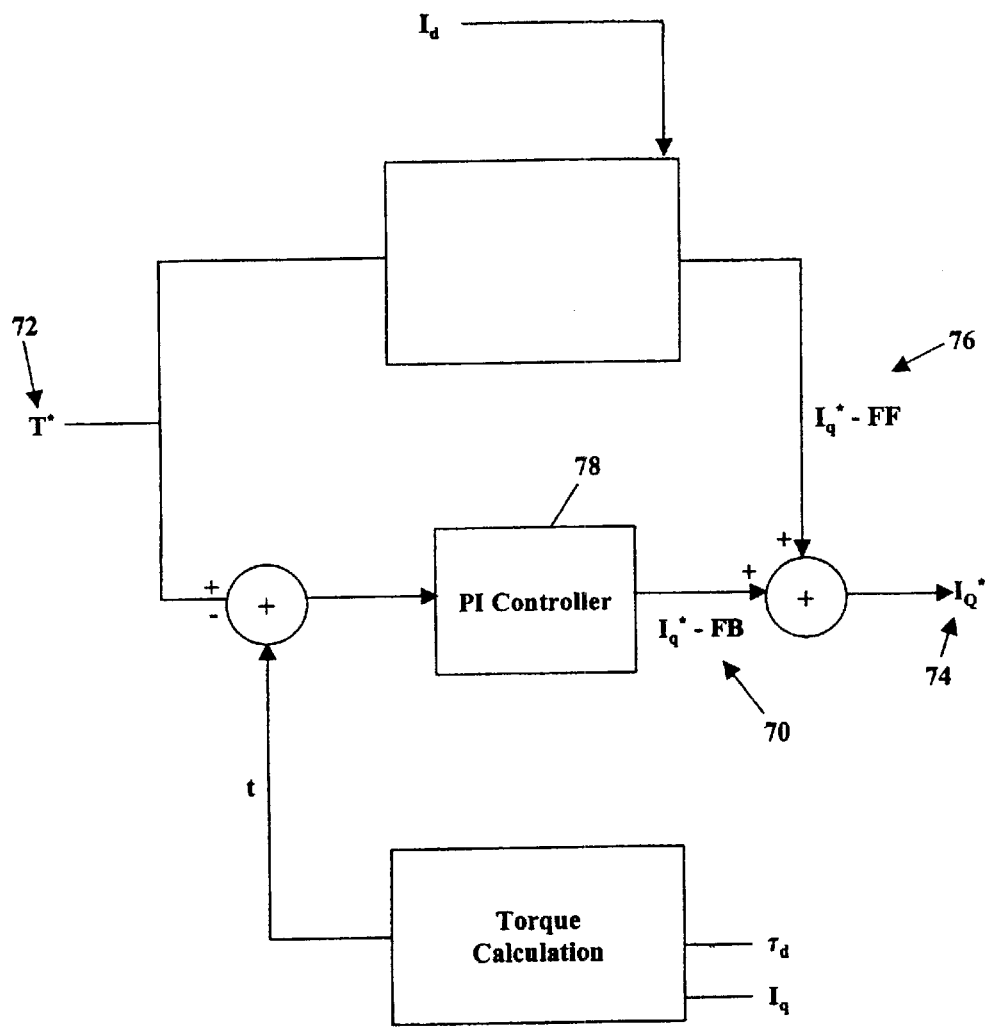
FIG. 2 is a schematic/functional block diagram illustrating the operation of the system of FIG. 1.

FIG. 2 illustrates the operation of the system 10 (FIG. 1) discussed above. Once a state of overmodulation is reached, the torque feedback (TorqueFb) is no longer smooth and the motor phase current is no longer a pure sinusoidal waveform. Thus, the feedback portion 70 of the system 10 may become unstable. In this overmodulation state, it is desirable that the conversion from a reference or commanded torque (TorqueRef or T*) 72 to a torque current $i_q$ or $I_Q$*74 depends primarily upon the feed forward portion 76 of the system 10 due to the fact that the output of the PI controller 78 is oscillated with the feedback torque TorqueFb while the torque current $i_q$ must remain stable for enhanced control. To overcome this problem, the gain of the PI controller 78 may be reduced to about $\frac{1}{4}^{th}$ to about $\frac{1}{20}^{th}$, and more preferably to about $\frac{1}{10}^{th}$, of the value typically used during overmodulation operation; that is, during normal modulation operation.

Figure 3:
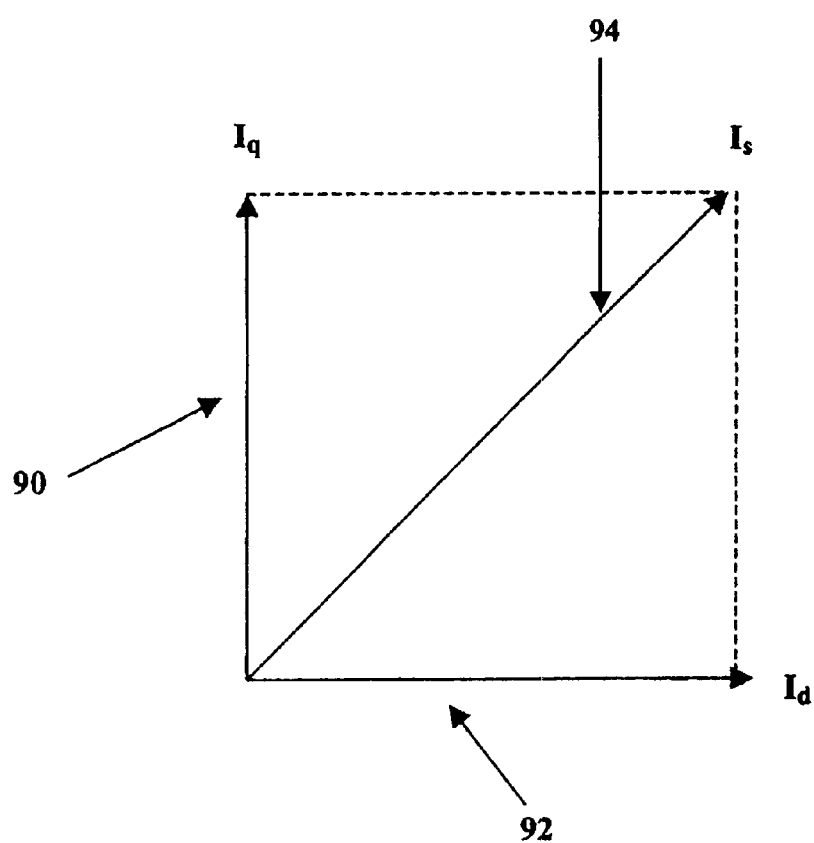
FIG. 3 is a plot of the relationship between torque current and flux current, and the contribution of each to phase current, under normal modulation conditions.
Figure 4:
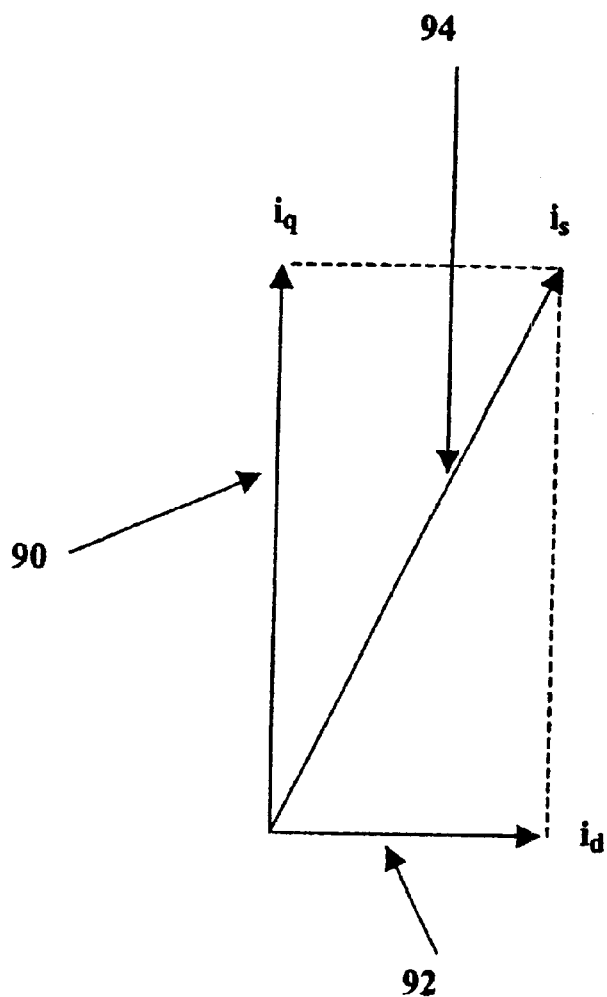
FIG. 4 is a plot of the relationship between torque current and flux current, and the contribution of each to phase current, under overmodulation/field-weakening conditions.

Referring again to FIG. 1, with respect to slip frequency 30, in another embodiment of the present invention, a first predetermined control parameter 26 may be defined by the following equation:

$$slipFrequency=(1/T_r)(i_q/i_d)+PI\_Controller(-emf\_d\_Fb), \quad (2)$$

where $i_d$ is the flux current and emf_d_Fb is the direct-axis back-EMF voltage feedback. $T_r$ is a time constant. Under normal modulation conditions, the ratio of torque current $i_q$ to flux current $i_d$ is fixed, with torque current $i_q$ equal to flux current $i_d$. FIG. 3 illustrates the relationship between torque current $i_q$ 90 and flux current $i_d$ 92, and the contribution of each to phase current $i_s$ 94, in a normal modulation state. Referring again to FIG. 1, once the motor 12 reaches a desired field-weakening state at high speed, with the inverter under six-step operation, a second predetermined control parameter 26 may be used to generate a processed command 18, 24. The PI controller may be disabled, disabling the closed loop portion of equation (2) (PI_Controller (−emf_d_Fb)). Thus, the slip frequency 30 depends solely upon the open loop portion of equation (2) ((1/T_r)(i_q/i_d). Optionally, the flux current $i_d$ may be reduced to allow greater torque current $i_q$ to be utilized, as phase current $i_s$ must remain constant. FIG. 4 illustrates the relationship between torque current $i_q$ 90 and flux current $i_d$ 92, and the contribution of each to phase current $i_s$ 94, in a field-weakening state. This increase in the ratio of torque current $i_q$ to flux current $i_d$, as demonstrated by equation (2), results in an increased slip frequency 30 and, therefore, increased torque output.

Figure 5:
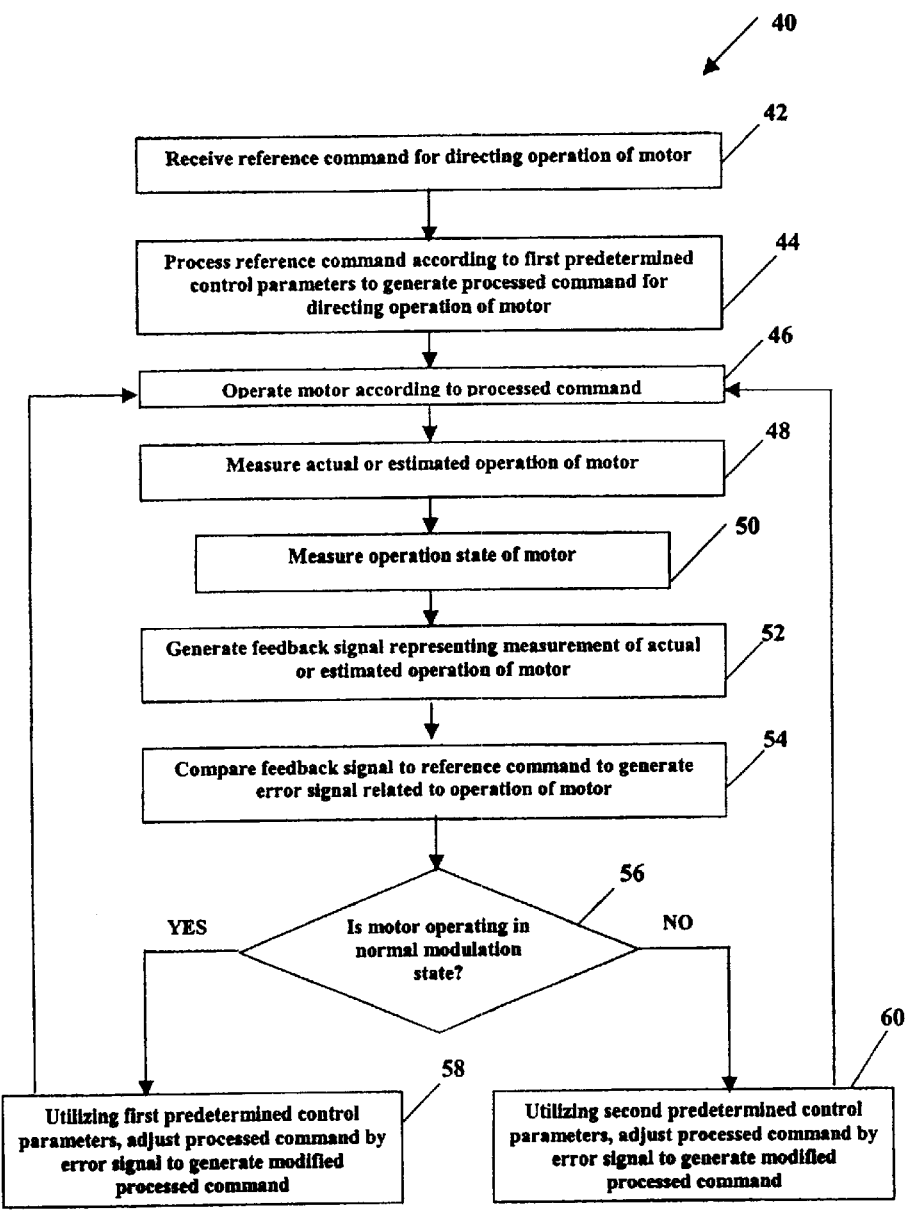
FIG. 5 is a flow chart of one embodiment of a method for enhancing the torque output of a field oriented induction motor operating in an overmodulation/field-weakening state, the method including utilizing a plurality of control parameters.

Referring to FIG. 5, one embodiment of a method 40 for directing and controlling the operation of a field oriented induction motor 12 (FIG. 1) includes receiving a reference command 16 (FIG. 1) for directing and controlling the operation of the motor 12 (Block 42). This reference command 16 may be processed according to a first predetermined control parameter 26 (FIG. 1) to generate a processed command 18 (FIG. 1) for directing and controlling the operation of the motor 12 (Block 44). The motor 12 may then be operated in accordance with this processed command 18 (Block 46). During operation, the actual or estimated operation of the motor 12 may be measured by the sensor system 20 (FIG. 1) (Block 48). The operational state of the motor 12 may also be measured (Block 50). The operational state may include, for example, the modulation state of the motor 12, the field-weakening state of the motor 12, etc. These measurements are then communicated back to the controller 14 (FIG. 1) as feedback signals 22 (FIG. 1) (Block 52). The controller 14 compares the feedback signals 22 to the reference command 16 to generate an error signal related to the operation of the motor 12 and analyzes the feedback signals 22 to determine what operational state the motor 12 is in (Block 54). If the motor 12 is operating in a normal modulation state (Block 56), the first predetermined control parameter 26 may be used to adjust the processed command 18 by an amount corresponding to the value of the error signal to generate a modified processed command 24 (FIG. 1) (Block 58). If the motor 12 is operating in an overmodulation/field-weakening state, the second predetermined control parameter 26 may be used to adjust the processed command 18 by an amount corresponding to the value of the error signal to generate a modified processed command 24 (FIG. 1) (Block 60). In either case, the modified processed command 24 may then be used to direct and control the operation of the motor 12 and the above method 40 is repeated.

The present invention has been described with reference to examples and preferred embodiments. Other examples and embodiments may achieve the same results. Variations in, and modifications to the present invention will be apparent to those skilled in the art and the following claims are intended to cover all such equivalents.

What is claimed is:

1. A method for enhancing the torque output of a field oriented induction motor, the method comprising:
   receiving feedback signals indicative of a number of operating parameters of the motor;
   determining an operational state of the motor from at least one of the feedback signals;
   producing a number of motor control signals according to a first transformation when the operational state of the motor corresponds to a normal modulation state, the first transformation comprising a closed loop portion and an open loop portion; and
   producing a number of motor control signals according to a second transformation when the operational state of the motor corresponds to an over-modulation state, the second transformation comprising a closed loop portion and an open loop portion, wherein the second transformation emphasizes the open loop portion over the closed loop portion with respect to the first transformation.

2. The method of claim 1 wherein producing a number of motor control signals according to a first transformation when the operational state of the motor corresponds to a normal modulation state comprises determining a number of torque current command signals according to the transformation $$i_q=TorqueRef/(3fluxFb)+PI\_Controller_1(TorqueRef-TorqueFb),$$

and wherein producing a number of motor control signals according to a second transformation when the operational state of the motor corresponds to an over-modulation state comprises determining a number of torque current command signals according to the transformation $$i_q = TorqueRef/(3fluxFb) + PI\_Controller_2(TorqueRef - TorqueFb),$$

where $i_q$ is a torque current command value, TorqueRef is a torque reference value, fluxFb is a flux feedback value, TorqueFB is a torque feedback value, PI_Controller$_1$ is a PI controller output employing a first gain, and PI_Controller$_2$ is a PI controller output employing a second gain, the second gain being between one quarter and one twentieth the first gain.

3. The method of claim 1 wherein producing a number of motor control signals according to a first transformation when the operational state of the motor corresponds to a normal modulation state comprises determining a number of torque current command signals according to the transformation $$i_q = TorqueRef/(3fluxFb) + PI\_Controller_1(TorqueRef - TorqueFb),$$

and wherein producing a number of motor control signals according to a second transformation when the operational state of the motor corresponds to an over-modulation state comprises determining a number of torque current command signals according to the transformation $$i_q = TorqueRef/(3fluxFb) + PI\_Controller_2(TorqueRef - TorqueFb),$$

where $i_q$ is a torque current command value, TorqueRef is a torque reference value, fluxFb is a flux feedback value, TorqueFB is a torque feedback value, PI_Controller$_1$ is a PI controller output employing a first gain, and PI_Controller$_2$ is a PI controller output employing a second gain, the second gain being approximately one tenth the first gain.

4. The method of claim 1 wherein producing a number of motor control signals according to a first transformation when the operational state of the motor corresponds to a normal modulation state comprises determining a number of slip frequency signals according to the transformation $$slipFrequency = (1/T_r)(i_q/i_d) + PI\_Controller(-emf\_d\_Fb)$$

with the PI_Controller enabled, and wherein producing a number of motor control signals according to a second transformation when the operational state of the motor corresponds to an over-modulation state comprises determining a number of slip frequency signals according to the transformation $$slipFrequency = (1/T_r)(i_q/i_d) + PI\_Controller(-emf\_d\_Fb)$$

with the PI_Controller disabled, where slipFrequency is a slip frequency value, TR is a time constant, $i_q$ is a torque current command value, $i_d$ is a flux current value, emf_d_Fb is a direct-axis back-EMF voltage feedback value, and PI_Controller is a PI controller output.

5. The method of claim 1 wherein producing a number of motor control signals according to a first transformation when the operational state of the motor corresponds to a normal modulation state comprises determining a number of slip frequency signals according to the transformation $$slipFrequency = (1/T_r)(i_q/i_d) + PI\_Controller(-emf\_d\_Fb)$$

with the ratio $i_q/i_d$ equal to one, and wherein producing a number of motor control signals according to a second transformation when the operational state of the motor corresponds to an over-modulation state comprises determining a number of slip frequency signals according to the transformation $$slipFrequency = (1/T_r)(i_q/i_d) + PI\_Controller(-emf\_d\_Fb)$$

with the ratio $i_q/i_d$ greater than one, where slipFrequency is a slip frequency value, TR is a time constant, $i_q$ is a torque current command value, $i_d$ is a flux current value, emf_d_Fb is a direct-axis back-EMF voltage feedback value, and PI_Controller is a PI controller output.

6. The method of claim 1 wherein producing a number of motor control signals according to a first transformation when the operational state of the motor corresponds to a normal modulation state comprises determining a number of slip frequency signals according to the transformation $$slipFrequency = (1/T_r)(i_q/i_d) + PI\_Controller(-emf\_d\_Fb)$$

with the PI_Controller enabled and the ratio of $i_q/i_d$ equal to one, and wherein producing a number of motor control signals according to a second transformation when the operational state of the motor corresponds to an over-modulation state comprises determining a number of slip frequency signals according to the transformation $$slipFrequency = (1/T_r)(i_q/i_d) + PI\_Controller(-emf\_d\_Fb)$$

with the PI_Controller disabled and the ratio $i_q/i_d$ greater than one, where slipFrequency is a slip frequency value, TR is a time constant, $i_q$ is a torque current command value, $i_d$ is a flux current value, emf_d_Fb is a direct-axis back-EMF voltage feedback value, and PI_Controller is a PI controller output.

7. A system for enhancing the torque output of a field oriented induction motor, the method comprising:
means for receiving feedback signals indicative of a number of operating parameters of the motor;
means for determining an operational state of the motor from at least one of the feedback signals;
means for producing a number of motor control signals according to a first transformation when the operational state of the motor corresponds to a normal modulation state, the first transformation comprising a closed loop portion and an open loop portion; and
means for producing a number of motor control signals according to a second transformation when the operational state of the motor corresponds to an over-modulation state, the second transformation comprising a closed loop portion and an open loop portion, wherein the second transformation emphasizes the open loop portion over the closed loop portion with respect to the first transformation.

8. The apparatus of claim 7 wherein the means for producing a number of motor control signals according to a first transformation when the operational state of the motor corresponds to a normal modulation state comprises means for determining a number of torque current command signals according to the transformation $$i_q = TorqueRef/(3 fluxFb) + PI\_Controller_1(TorqueRef - TorqueFb),$$

and wherein means for producing a number of motor control signals according to a second transformation when the operational state of the motor corresponds to an over-modulation state comprises means for determining a number of torque current command signals according to the transformation $$i_q = TorqueRef/(3 fluxFb) + PI\_Controller_2(TorqueRef - TorqueFb),$$

where $i_q$ is a torque current command value, TorqueRef is a torque reference value, fluxFb is a flux feedback value, TorqueFB is a torque feedback value, PI_Controller$_1$ is a PI controller output employing a first gain, and PI_Controller$_2$ is a PI controller output employing a second gain, the second gain being between one quarter and one twentieth the first gain.

9. The method of claim 7 wherein the means for producing a number of motor control signals according to a first transformation when the operational state of the motor corresponds to a normal modulation state comprises means for determining a number of torque current command signals according to the transformation $$i_q = TorqueRef/(3 fluxFb) + PI\_Controller_1(TorqueRef - TorqueFb),$$

and wherein the means for producing a number of motor control signals according to a second transformation when the operational state of the motor corresponds to an over-modulation state comprises means for determining a number of torque current command signals according to the transformation $$i_q = TorqueRef/(3 fluxFb) + PI\_Controller_2(TorqueRef - TorqueFb),$$

where $i_q$ is a torque current command value, TorqueRef is a torque reference value, fluxFb is a flux feedback value, TorqueFB is a torque feedback value, PI_Controller$_1$ is a PI controller output employing a first gain, and PI_Controller$_2$ is a PI controller output employing a second gain, the second gain being approximately one tenth the first gain.

10. The method of claim 7 wherein the means for producing a number of motor control signals according to a first transformation when the operational state of the motor corresponds to a normal modulation state comprises means for determining a number of slip frequency signals according to the transformation $$slipFrequency = (1/T_r)(i_q/i_d) + PI\_Controller(-emf\_d\_Fb)$$

with the PI_Controller enabled, and wherein the means for producing a number of motor control signals according to a second transformation when the operational state of the motor corresponds to an over-modulation state comprises means for determining a number of slip frequency signals according to the transformation $$slipFrequency = (1/T_r)(i_q/i_d) + PI\_Controller(-emf\_d\_Fb)$$

with the PI_Controller disabled, where slipFrequency is a slip frequency value, TR is a time constant, $i_q$ is a torque current command value, $i_d$ is a flux current value, emf_d_Fb is a direct-axis back-EMF voltage feedback value, and PI_Controller is a PI controller output.

11. The method of claim 7 wherein means for producing a number of motor control signals according to a first transformation when the operational state of the motor corresponds to a normal modulation state comprises means for determining a number of slip frequency signals according to the transformation $$slipFrequency = (1/T_r)(i_q/i_d) + PI\_Controller(-emf\_d\_Fb)$$

with the ratio $i_q/i_d$ equal to one, and wherein the means for producing a number of motor control signals according to a second transformation when the operational state of the motor corresponds to an over-modulation state comprises means for determining a number of slip frequency signals according to the transformation $$slipFrequency = (1/T_r)(i_q/i_d) + PI\_Controller(-emf\_d\_Fb)$$

with the ratio $i_q/i_d$ greater than one, where slipFrequency is a slip frequency value, TR is a time constant, $i_q$ is a torque current command value, $i_d$ is a flux current value, emf_d_Fb is a direct-axis back-EMF voltage feedback value, and PI_Controller is a PI controller output.

12. The method of claim 7 wherein the means for producing a number of motor control signals according to a first transformation when the operational state of the motor corresponds to a normal modulation state comprises means for determining a number of slip frequency signals according to the transformation $$slipFrequency = (1/T_r)(i_q/i_d) + PI\_Controller(-emf\_d\_Fb)$$

with the PI_Controller enabled and the ratio of $i_q/i_d$ equal to one, and wherein the means for producing a number of motor control signals according to a second transformation when the operational state of the motor corresponds to an over-modulation state comprises means for determining a number of slip frequency signals according to the transformation $$slipFrequency = (1/T_r)(i_q/i_d) + PI\_Controller(-emf\_d\_Fb)$$

with the PI_Controller disabled and the ratio $i_q/i_d$ greater than one, where slipFrequency is a slip frequency value, TR is a time constant, $i_q$ is a torque current command value, $i_d$ is a flux current value, emf_d_Fb is a direct-axis back-EMF voltage feedback value, and PI_Controller is a PI controller output.

13. A system for enhancing the torque output of a field oriented induction motor, the system comprising:

a sensor system operable to produce feedback signals indicative of a number of operating parameters of the motor; and a controller coupled to receive feedback signals from the sensor system and configured to produce a number of motor control signals based on a first transformation when the feedback signals indicate that the motor is operating in a normal modulation state, the first transformation comprising an open loop portion and a closed loop portion, and to produce a number of motor control signals based on a second transformation when the feedback signals indicate that the motor is operating in an overmodulation state, the second transformation comprising an open loop portion and a closed loop portion, wherein the second transformation emphasizes an open loop portion over a closed loop portion with respect to the first transformation.

14. The system of claim 13 wherein a gain in the closed loop portion of the second transformation is between one quarter and one twentieth, inclusive, of a gain in the closed loop portion of the first transformation.

15. The system of claim 13 wherein a gain in the closed loop portion of the second transformation is approximately one tenth of a gain in the closed loop portion of the first transformation.

16. The system of claim 13 wherein the motor control signals comprise torque current command signals, the first transformation is $$i_q = TorqueRef/(3fluxFb) + PI\_Controller_1(TorqueRef - TorqueFb)$$

and the second transformation is $$i_q = TorqueRef/(3fluxFb) + PI\_Controller_2(TorqueRef - TorqueFb),$$

where $i_q$ is a magnitude of the torque current command, TorqueRef is a torque reference value, fluxFb is a flux feedback value measured by the sensor system, TorqueFb is a torque feedback value measured by the sensor system, $PI\_Controller_1$ is a proportional-integral controller output employing a first gain and $PI\_Controller_2$ is a proportional-integral controller output employing a second gain.

17. The system of claim 13 wherein the controller comprises at least one proportional-integral controller and the motor control signals comprise slip frequency signals, where the open loop portion is emphasized by enabling the proportional-integral controller when the motor is operating in the normal modulation state and by disabling the proportional-integral controller when the motor is operating in the overmodulation state.

18. The system of claim 13 wherein the motor control signals comprise slip frequency signals where the open loop portion is emphasized by increasing a ratio of torque current to flux current in the open loop portion of the second transformation from a ratio of torque current to flux current in the open loop portion of the first transformation.

19. The system of claim 13 wherein the sensor system comprises a feedback subsystem operable to produce the feedback signals related to the operational condition of the motor and a feedforward subsystem operable to produce feedforward signals related to the operational condition of the motor, the controller configured to employ the feedback signals in the closed loop portion of the first and the second transformations and to employ the feedforward signals in the open loop portion of the first and the second transformations.

20. A system for enhancing the torque output of a field oriented induction motor, the system comprising:

a sensor system operable to produce feedback signals related to at least one operational condition of the motor; and a controller coupled to receive feedback signals from the sensor system and configured to produce motor control signals based on an operating state of the motor wherein the controller diminishes a closed loop portion of a calculation of a magnitude of the motor control signals with respect to an open loop portion of the calculation when the feedback signals indicate that the motor is operating in an overmodulation state relative to the closed loop portion of the calculation of the magnitude of the motor control signals when the feedback signals indicate that the motor is operating in a normal modulation state.

21. The system of claim 20 wherein the controller comprises a proportional-integral controller, the proportional-integral controller enabled when the feedback signals indicate that the motor is operating in the normal modulation state and the proportional-integral controller disabled when the feedback signals indicate that the motor is operating in the overmodulation state.

22. The system of claim 20 wherein the controller employs a first ratio of torque current to flux current in the calculation of magnitude of the motor control signals when the feedback signals indicate that the motor is operating in the normal modulation state and employs a second ratio of torque current to flux current in the calculation of the magnitude of the motor control signals when the feedback signals indicate that the motor is operating in the overmodulation state, where the first ratio of torque current to flux current is greater than the second ratio of torque current to flux current.

23. The system of claim 20 wherein the controller reduces a gain in the closed loop portion of the calculation of magnitude of the motor control signals by between one quarter and one twentieth, inclusive, when the feedback signals indicate that the motor is operating in the overmodulation state versus the gain in the closed loop portion of the calculation of magnitude of the motor control signals when the feedback signals indicate that the motor is operating in the normal modulation state.

24. The system of claim 20 wherein the controller reduces a gain in the closed loop portion of the calculation of magnitude of the motor control signals by approximately one tenth when the feedback signals indicate that the motor is operating in the overmodulation state versus the gain in the closed loop portion of the calculation of magnitude of the motor control signals when the feedback signals indicate that the motor is operating in the normal modulation state.

* * * * *

UNITED STATES PATENT AND TRADEMARK OFFICE
CERTIFICATE OF CORRECTION

PATENT NO. : 6,707,270 B2
DATED : March 16, 2004
INVENTOR(S) : Li Chen et al.

It is certified that error appears in the above-identified patent and that said Letters Patent is hereby corrected as shown below:

Column 5,
Lines 13 and 37, "TorqueFB" should read -- TorqueFb --.
Line 50, "with the PI" should read -- with a PI --.

Column 6,
Line 16, "value, TR is" should read -- value, T is --.
Line 64, "apparatus" should read -- system --.

Column 7,
Line 6, "wherein means" should read -- wherein the means --.
Lines 17 and 41, "TorqueFB" should read -- TorqueFb --.
Lines 22 and 47, "The method of" should read -- The system of --.
Line 55, "with the PI" should read -- with a PI --.
Line 66, "value, TR is" should read -- value, T is --.

Column 8,
Lines 4 and 28, "The method of" should read -- The system of --.
Lines 23 and 49, "value, TR is" should read -- value, T is --.
Line 37, "with the PI" should read -- with a PI --.
Line 58, "receive feedback" should read -- receive the feedback --.

Column 9,
Line 3, "an open" should read -- the open --.
Line 3, "over a closed" should read -- over the closed --.
Line 33, "where" should read -- wherein --.
Line 40, "signals where" should read -- signals and wherein --.
Line 47, "the operational condition" should read -- an operating state --.
Line 49, "operational condition" should read -- operating state --.
Line 50, "motor, the" should read -- motor, and wherein the --.
Line 50, "controller configured" should read -- controller is configured --.

Column 10,
Line 5, "receive feedback" should read -- receive the feedback --.
Line 27, "of magnitude" should read -- the magnitude --.
Line 33, "state, where" should read -- state, and wherein --.

UNITED STATES PATENT AND TRADEMARK OFFICE
CERTIFICATE OF CORRECTION

PATENT NO.   : 6,707,270 B2
DATED        : March 16, 2004
INVENTOR(S)  : Li Chen et al.

It is certified that error appears in the above-identified patent and that said Letters Patent is hereby corrected as shown below:

<u>Column 10 (cont'd),</u>
Lines 37-38, 42, 46-47 and 50, "calculation of magnitude" should read -- calculation of the magnitude --.

Signed and Sealed this

Twentieth Day of December, 2005

JON W. DUDAS
*Director of the United States Patent and Trademark Office*